(12) United States Patent
Fujinami

(10) Patent No.: US 6,341,192 B1
(45) Date of Patent: Jan. 22, 2002

(54) DECODING METHOD AND DECODING PLAYER AND RECORDING MEDIUM

(75) Inventor: Yasushi Fujinami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/129,590

(22) Filed: Aug. 5, 1998

(30) Foreign Application Priority Data

Aug. 8, 1997 (JP) ............................................. 9-215213

(51) Int. Cl.[7] ................................................. H04N 5/93
(52) U.S. Cl. ............................. 386/52; 386/64; 386/82; 360/13
(58) Field of Search ................................. 386/4, 52, 54, 386/53, 64, 82, 96, 105, 106; 360/13, 15, 23; 345/328; 369/83

(56) References Cited

U.S. PATENT DOCUMENTS 4,394,745 A * 7/1983 Menezes et al. ............... 386/54
5,625,461 A * 4/1997 Okamoto et al. .............. 386/53
5,636,311 A * 6/1997 Nakatami ........................ 386/4
6,094,522 A * 7/2000 Ito et al. ........................ 386/52

* cited by examiner

Primary Examiner—Wendy R. Garber
Assistant Examiner—Christopher Onuaku
(74) Attorney, Agent, or Firm—Frommer Lawrence & Haug LLP; William S. Frommer; Dexter T. Chang

(57) ABSTRACT

A stream whose redundancy has been eliminated using the continuity specified particularly in the MPEG and the like, is interrupted once, and well connected to another stream. An edit point decoding method for reproducing and decoding data from a disc in which an edited MPEG stream is recorded. Before a time for output of an edit-out point is reached, a stream in a section X is decoded and scored. When an outfit time for the leading position of the section X is reached, a stream in a section Z is decoded (not output) while the decoded data from the leading position of the section X is being output. When a time for output of the edit-in point is reached, an encoded data row following the section Z is decoded and output.

10 Claims, 17 Drawing Sheets

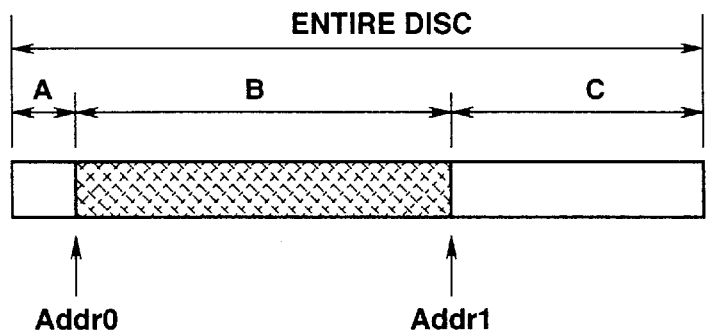
FIG.1A
FIG.1B
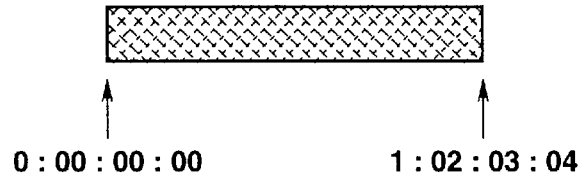
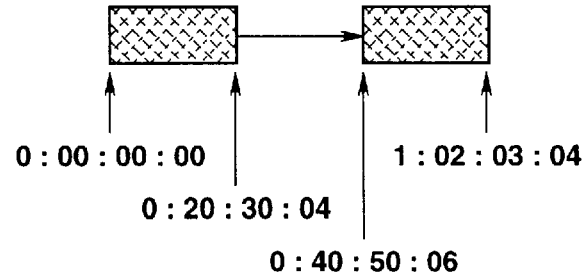
FIG.2

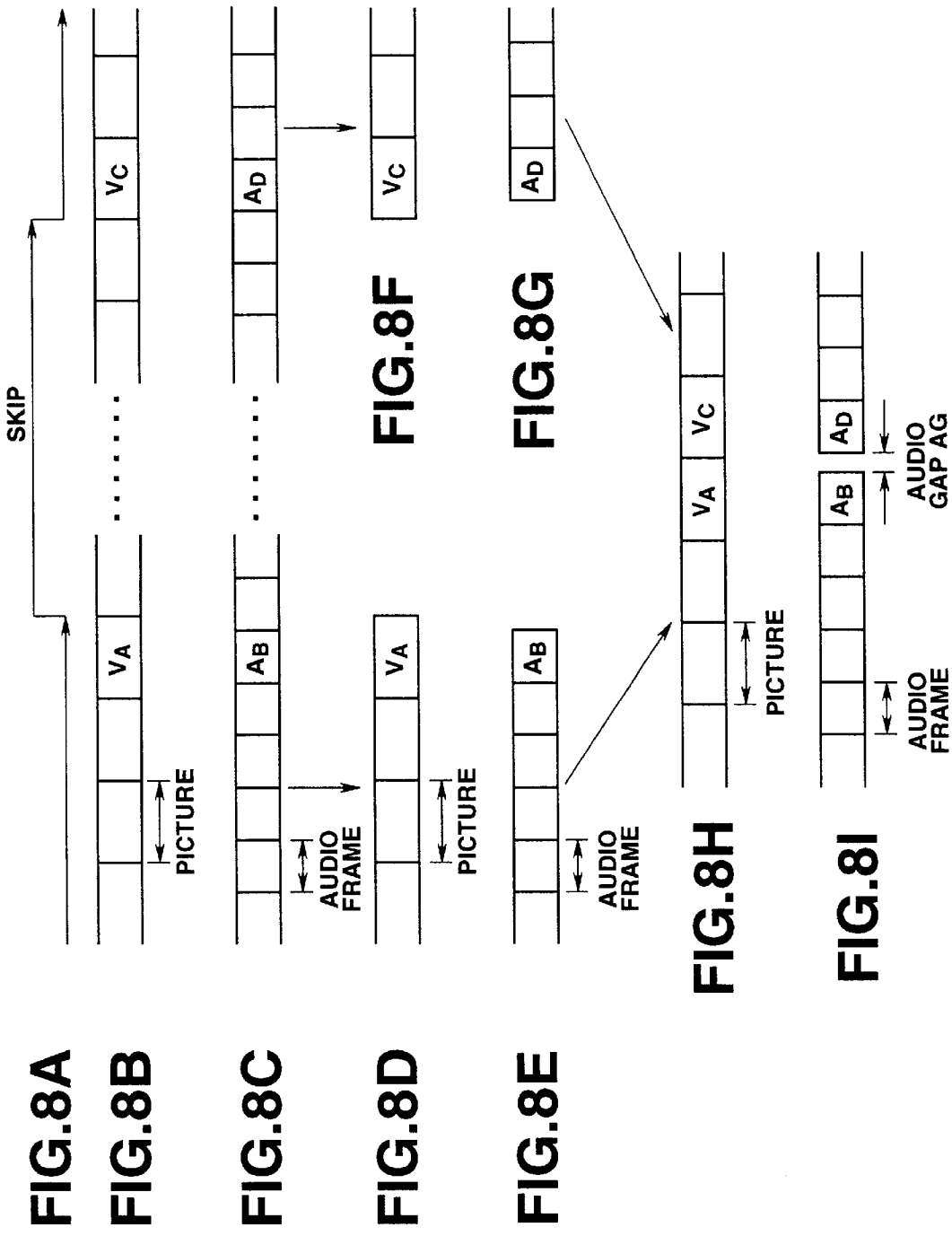

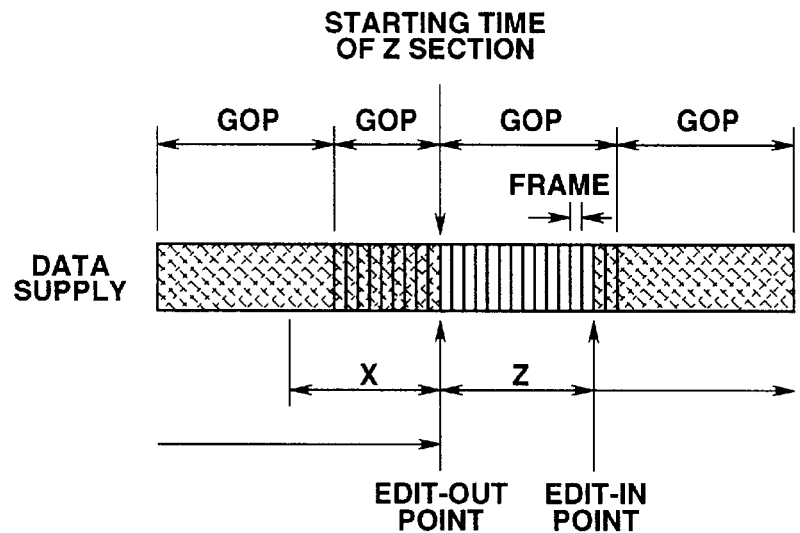
FIG.14A DATA SUPPLY
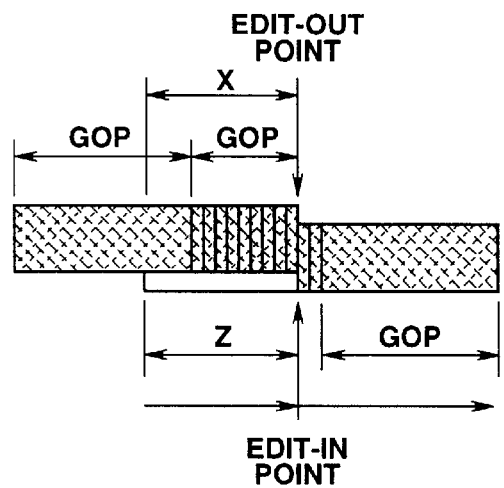
FIG.14B DISPLAY

DECODING METHOD AND DECODING PLAYER AND RECORDING MEDIUM

BACKGROUND OF THE INVENTION

1. Field of the Invention

The present invention relates to an edit point decoding method suitable for use with moving picture image signals, sound signals, etc. edited and recorded in a random access recording medium such as a magneto-optic disc, a decoding player adapted to read a recording medium in which such edited signals are recorded, and a recording medium having such edited signals recorded therein.

2. Description of Related Art

Assume here that, for example, a moving picture image signal, sound signal, etc. having a length of time of 1 hour, 2 minutes and 3 seconds and consisting of 4 frames are recorded in a fresh recording medium (random access or accessible recording medium such as magneto-optic disc or the like; it will be referred to simply as "disc" hereafter). The recorded data are laid on the disc as shown in FIGS. 1A and 1B. FIG. 1A shows three recording areas A, B and C on the disc. The recording areas are contiguous like a line extending from the innermost perimeter of the disc to the outermost perimeter. FIG. 1B shows only one of the three areas, say, the area B.

As mentioned above, the entire disc consists of the three areas A, B and C. The area A is the innermost area on the disc. The areas B and C extend from the area A toward the outermost perimeter of the disc.

The area A shown in FIG. 1A has recorded therein an information for managing the information recorded on the disc, namely, a so-called "TOC (Table Of Contents)". The TOC includes at least "entries" and a plurality of "areas for describing the entries". Each of the entries specifies at least information such as "start address", "end address", "start time code", "end time code", and "next entry".

The "start address" has described therein a leading address of an area managed by the entries. The leading address is an address determined by a physical medium, or an address of a file system, configured on a physical address, as the case may be.

The "end address" has described therein an end address of the area managed by an entry.

The "start time code" has described therein a start time code of a moving picture image data recorded in the area managed by the entries.

The "end time code" has described therein an end time code of a moving picture image data recorded in the area managed by the entries.

The "next entry" has described therein a number for a further entry, if any, to be reproduced during disc reading. If there exists no next entry to be reproduced, "Null" is described in the "next entry".

The TOC in the following description is configured on the assumption that the time codes in the entries are continuous. On any other assumption, however, the TOC will be configured otherwise than herein.

There is recorded in the area B in FIGS. 1A and 1B, the moving picture image information having a length of time of 1 hour, 2 minutes and 3 seconds and consisting of 4 frames. It is assumed here that the moving picture image information includes an MPEG2 Video signal and an MPEG2 Audio signal resulted from time-division multiplexing with a Program Stream of a so-called MPEG2 system, for example.

However, the essentials of the video and audio signals will not vary even if any other time-division multiplexing method and video and audio coding methods are adopted for generation of the video and audio signals. The MPEG referred to herein stands for the Moving Picture Experts Group being the Image Coding group of the ISO/IEC JTC/SC29 (International Organization for Standardization/ International Electrotechnical Commission, Joint Technical Committee 1/Sub Committee 29). The MPEG1 standard include ISO 11172, and the MPEG2 standard includes ISO 13818. In these international standards, ISO 11172-1 and ISO 13818-1 are included in the item of system multiplexing, ISO 11172-2 and ISO 13818-2 are included in the item of video coding, and ISO 11172-3 and ISO 13818-2 are included in the item of audio coding.

In FIG. 1A, the area C has nothing recorded therein.

The following information are recorded in the area A (TOC). In this condition, the TOC has one entry.

Entries=1
Contents of entry 0
  Start address=addr0
  End address=addr1
  Start time code=0:00:00:00 (as in FIG. 1B)
  End time code=1:02:03:04 (as in FIG. 1B)
  Next entry=None
Contents of entry 1 (same as above)
  Null information Currently, the area B in FIGS. 1A and 1B has recorded therein the MPEG stream between 0 hour, 0 minute, 0 second, and 0 frame (0:00:00:00) indicated with the start time code and 1 hour, 2 minute, 3 seconds and 4 frames (1:02:03:04) indicated with the end time code. Also, the area C has nothing recorded therein as shown in FIG. 1A.

The editing procedure using a disc having the above-mentioned video and audio information recorded therein will be described herebelow:

As one example of the editing procedure, a partial deletion of the data recorded in the disc as mentioned above will be explained with reference to FIGS. 3A and 3B As shown, a part between 0 hour, 0 minute, 0 second and 0 frame (0:00:00:00) and 0 hour, 20 minutes, 30 seconds and 4 frames (0:20:30:04), and a part between 0 hour, 40 minutes, 50 seconds and 6 frames (0:40:50:06) and 1 hour, 2 minutes, 3 seconds and 4 frames (1:02:03:04), are to be left on the disc. That is, a part between 0 hour 20 minutes, 30 seconds and 5 frames (0:20:30:05) and 0 hour, 40 minutes, 50 seconds and 5 frames (0:40:50:05), is to be deleted.

An edition of a data, say, a partial deletion of the data, as in the above will lead to two different results, depending upon how the stream is arranged after the data edition.

That is to say, the partial data deletion can be done with two techniques. The data is forwarded or not for the deleted part at the time of editing. In other words, skip has to be done or not over the deleted part at the time of reproducing the edited data. More particularly, after the data is partially deleted, a subsequent data is forwarded for a blank part resulted from the deletion (which will be called "first editing method" hereafter), and the stream position is reserved just with the unnecessary part deleted (which will be called "second editing method" hereafter). Thus, the edition will lead to the two different results of edition depending upon the adopted editing method (arrangement of the stream). However, the edit points in the results are little different from each other. This is because both the techniques of edition have some problems which will not be further described herein.

First, the result of the first editing method (the subsequent data forwarded for the blank part after the deletion of an unnecessary part) adopted as the editing procedure (arrangement of data streams) will be described in detail below:

FIGS. 3A and 3B schematically show the result of edition from the first editing method. FIG. 3A shows three recording areas A, B and C on the disc. The recording areas A, B and C are contiguous like a line extending from the innermost perimeter of the disc to the outermost perimeter. FIG. 3B shows only one of the three areas, say, the area B in which the data is forwarded for the deleted unnecessary part.

In the example shown in FIGS. 3A and 3B, a part between 0 hour, 20 minutes, 30 seconds and 5 frames (0:20:30:05) being a frame next to 0 hour, 20 minute, 30 second and 4 frames (0:20:30:04) in FIG. 2 and 0 hour, 40 minutes, 50 seconds and 5 frames (0:40:50:05) being a frame preceding 0 hour, 40 minutes, 50 seconds and 6 frames (0:40:50:06) in FIG. 2 is deleted and the subsequent data is forward to the trailing end of the former data.

By forwarding the subsequent data for the deleted unnecessary part as in the example shown in FIGS. 3A and 3B, an area corresponding to the deleted part will be a new area in which data can be recorded, thus, the area C will be expanded correspondingly.

Through the edition as in FIGS. 3A and 3B is done, the following information will be recorded in the TOC. In this condition, the TOC includes two entries:

Entries=2
Contents of entry 0
    Start address=addr0
    End address=addr2
    Start time code=
    End time code=0:20:30:04
    Next entry=1
Contents of entry 1
    Start address addr2+1
    End address=addr3
    Start time code=0:40:50:06
    End time code=1:02:03:04
    Next entry=None
Contents of entry 2 (same as above)
    Null information In this first editing method, it is necessary to forward data for only the deleted part. However, it is not necessary to skip over the unnecessary part in a subsequent reproduction.

To implement the forwarding in the first editing method, however, the part to be forwarded, say, a part between 0 hour, 40 minutes, 50 seconds and 6 frames (0:40:50:06) and 1 hour, 2 minutes, 3 seconds and 4 frames (1:02:03:04) has to be saved once in any other recording medium (for example, hard disc) and recorded again as shown in FIG. 2, which is not practical.

On the other hand, when the second editing method (the stream position is kept unchanged with only the unnecessary part deleted) is adopted, it is not required to save the data into the other recording medium temporarily and re-recorded. FIGS. 4A and 4B schematically show the results of an using the second editing method. As seen, FIG. 4A shows three recording areas A, B and C on the disc. The recording areas A, B and C are contiguous like a line extending from the innermost perimeter of the disc to the outermost perimeter. FIG. 4B shows only the stream whose position remains unchanged just with the unnecessary part deleted.

In the example shown in FIGS. 4A and 4B, a part between 0 hour, 20 minutes, 30 seconds and 5 frames (0:20:30:05) being a next frame to 0 hour, 20 minute, 30 second and 4 frames (0:20:30:04) in FIG. 2 and 0 hour, 40 minutes, 50 seconds and 5 frames (0:40:50:05) being a frame preceding 0 hour, 40 minutes, 50 seconds and 6 frames (0:40:50:06) in FIG. 2 is left deleted while the stream position is kept unchanged.

To reproduce the edited data by the second editing method as in FIGS. 4A and 4B, a continuous reproduction by entering the TOC is designated. More particularly, the TOC edited as in the example shown in FIGS. 4A and 4B will have the following information recorded therein. In this condition, the TOC includes two entries as follows:

Entries=2
Contents of entry 0
    Start address=addr0
    End address=addr2
    Start time code=0:00:00:00
    End time code=0:20:30:04
    Next entry=1
Contents of entry 1
    Start address=addr4
    End address=addr1
    Start time code=0:40:50:06
    End time code=1:02:03:04
    Next entry=None
Contents of entry 2 (same as above)
    Null information In this second editing method, any thing (such as temporal save, forwarding, etc. as in the first editing method) may not be done at the time of the edition but it is necessary to skip over the unnecessary part at the time of reproduction.

Seemingly, the data edited by the first editing method as previously mentioned can be subsequently reproduced with no seam between the data on the recording medium (disc) by decoding it as it is read from the recording medium.

Also, it seems that the result of edition from the second editing method can be subsequently reproduced with no seam between the streams by skipping over the unnecessary part of the data and connecting to each other the data streams before and after the skipped part. Further, seemingly the connection between the streams before and after the unnecessary part over which the skip is made can theoretically be achieved just by selecting a sector address to be decoded.

For the reproduction, however, the inherently contiguous streams are disconnected from each other and another stream is connected. Therefore, if it is intended to reproduce a data whose redundancy is eliminated by using the continuity specified particularly in the MPEG and the like, the streams cannot easily be connected to each other at a desired point of connection. That is, an MPEG data is compression-coded using a signal before or a signal after the MPEG data, or both, and thus the compression-coded data cannot be decoded simply by connecting the two streams to each other.

The problems possibly taking place when an MPEG stream is subjected to an edition such as the second editing method in which skipping must be done at the time of reproduction, will be described below. The description will also true for the first editing method.

First, the MPEG will be briefly described and then the problems will be described.

The MPEG provides three types of coding such as I, B and P pictures for efficient coding of an image and for random access to the encoded image. The pictures referred to herebelow are ones whose frames or fields composing an moving picture image are encoded.

The I picture is a completely encoded one in the above-mentioned frame and encoded independently of other frames, Therefore, the I picture is used as an entry point for restoration of a random access or an error.

The P picture is predicted from an earlier I or P picture in a mode in which a forward prediction coding is done. Therefore, for decoding a P picture, the earlier I or P picture must have been decoded.

The B picture is a development of a P picture. It is predicted forward, backward or in both directions from an earlier and later I or P picture. Therefore, to decode a B picture, an I or P picture before and after the B picture, respectively, should have been decoded.

Generally, in the common applications, I, B and P pictures are used in combination to achieve a random access and a high efficiency of coding.

FIGS. 5A and 5B show together an example of such combination of I, B and P pictures. In FIG. 5A, the above-mentioned I, B and P pictures are arranged in the displaying order. The arrow d in this Figure indicates a predicting direction. To decode the B picture for display, for example, I or P pictures displayed before and after the B picture in a time sequence should be decoded prior to the decoding of the B picture. More particularly, for a displaying order as shown in FIG. 5A, for example, to decode an image of the picture B5, at least the pictures I0, P2, P4 and P6 should have been decoded. That is to say, the picture P2 is predicted from I0, P4 is from P2, P6 is from I0, and B5 is from P4 and P6. Thus, for decoding the B5 picture, the pictures I0, P2, P4 and P6 should previously been decoded. For this purpose, the pictures are rearranged in an order of I0, P2, B1, P4, B3, . . . in the coding stream as shown in FIG. 5B. In other words, the medium (disc) has recorded thereon an encoded stream in the order of pictures shown in FIG. 5B. Therefore, for reproduction of this disc and display an image on a display unit, each picture is decoded from the encoded stream reproduced from the disc in the order shown in FIG. 5B, and rearranged as shown in FIG. 5A.

For the audio data coding, compression techniques such as the so-called AC-3 (ATSC standard Doc. A/52, 20 Dec. 1995) are available in addition to the aforementioned MPEG. In all these compression techniques, a predetermined number of sampled data is handled as a unit for coding as well as for decoding.

Generally, the period of decoding an audio frame being a unit of audio decoding has no coincidence with that of decoding a picture resulted from coding of video data. FIGS. 6A and 6B show time sequences of video decoding and audio decoding, respectively. FIG. 6A shows constitutive units (pictures) of an encoded data of an image, and a time point TP at which display of each picture is started, and FIG. 6B shows constitutive units (audio frames) of an encoded data of a sound, and a time point TA of each audio frame. As seen from FIGS. 6A and 6B, the period of decoding the audio frame does not coincide with that of decoding the picture.

In the recent standardized and commercially available products such as video CD and DVD (digital video disc), an image is encoded according to the aforementioned MPEG and a sound is encoded according to the MPEG or AC-3. Such data are time-division multiplexed as in the MPEG standard for recording on a disc.

Now, recording in a medium such as a disc of an image data encoded as in the aforementioned MPEG standard and edited by the aforementioned second editing method, will be discussed below. In this recording, the pictures are laid as shown in FIG. 7A taking in consideration the efficiency of coding and random accessibility. In the example shown in FIG. 7A, of the video stream resulted from the edition by the second technique, a stream down to a P picture indicated at a point SA is reproduced, skip is made over the subsequent pictures, and the reproduction of the stream is resumed at a B picture (B3) indicated at a point SB. Note that the skip start point corresponds to the edit out point and skip end point corresponds to the edit-in point.

To decode the B picture (picture B3 in the example in FIG. 7B), however, the I or P picture before the picture B3 (at least each of the pictures I0, P2 and P4 in the example in FIG. 7A) should have been decoded. In the above example, the video signal is encoded as in the MPEG, however, it should be appreciated that even in a prediction-coding technique in which the inter-image correlation is used to determine and encode a difference between the images, the reproduction will possibly be discontinued at the connections between the streams for the above-mentioned reasons.

On the other hand, in the aforementioned MPEG or AC-3 in which a predetermined number of sampled data is used as a unit of coding in the audio coding technique, the period of decoding a video signal is not always coincident with that of decoding an audio signal. Thus, if a continuous reproduction of a video signal is preferentially done while two streams are connected to each other at an edit point, a blank section takes place in which an audio signal is not generated, as will be described below. The blank section will be referred to as "audio gap" hereafter.

FIGS. 8B and 8C show time sequences of encoded video and audio data, respectively, recorded in a disc.

A following procedure will be described herebelow. That is, the video signal in FIG. 8B down to a picture (end of a picture VA in the example in FIG. 8D, corresponding to an edit-out point), is reproduced and displayed, and then the reproduction and decoding are resumed from another picture shown in FIG. 8F (top of a picture VC in the example in FIG. 8F, corresponding to an edit-in point) via skip over data as timed as shown in FIG. 8A.

For decoding of an audio signal at (corresponding to) the connection between such video signal streams, audio frames down to an audio frame AB corresponding to the picture VA will be decoded as shown in FIG. 8E, and then reproduction and decoding be restarted from an audio frame AD corresponding to the picture VC as in FIG. 8G.

The video and audio signals have to be reproduced synchronously with each other. To this end, the phase difference of the audio signal with respect to the video signal, say, the phase difference between picture display start time and audio frame start time, should not be varied due to the edition.

However, if a continuous display is tried by preferentially connecting the video streams to each other at the stream connection during an edition as shown in FIG. 8H, namely, by connecting to each other the picture VA before the skip and the picture VC after the skip to each other, there will occur a time duration (audio gap AG) in which no audio data exists in the audio stream as shown in FIG. 8I, resulting in an impossibility of continuous audio reproduction.

SUMMARY OF THE INVENTION

Accordingly, the present invention has an object to overcome the above-mentioned drawbacks of the prior art by providing a method and player for decoding edit points, and a recording medium, in which a good connection can be achieved between data streams when connecting to each other the data streams edited with their redundancy removed based on the data continuity as in the MPEG, etc. and recorded in the recording medium, interrupting once the stream read from the recording medium and connecting it to another data stream.

The above object can be accomplished by providing a method and player for reading an encoded data row consisting of a succession of predetermined encoded data groups including a plurality of frames, and a reproduction control information including information on an edit-out point and edit-in point, respectively, for use in data edition, from a random-accessible recording medium having recorded therein at least the encoded data row and reproduction control information, and decoding the read encoded data row based on the reproduction control information, in which before a time for output of the edit-out point is reached, a leading position of a first section consisting of encoded data row before the edit-out point is calculated based on the reproduction control information and the encoded data row in the first section is decoded and stored; when an output time for the leading position of the first section is reached, the encoded data row in a second section between the edit-out point and an edit-in point is decoded while the decoded data from the leading position of the first section is being output; and when a time for output of the edit-in point is reached, the encoded data row following the second section is decoded and output.

Also, the above object can be accomplished by providing a method and player for reading an encoded data row consisting of a succession of predetermined encoded data groups comprising a plurality of frames, and a reproduction control information including information on an edit-out point and edit-in point, respectively, for use in data edition, from a random-accessible recording medium having recorded therein at least the encoded data row and reproduction control information, and decoding the read encoded data row based on the reproduction control information, in which before a time for output of the edit-out point is reached, a leading position of a first section consisting of encoded data row before the edit-out point is calculated based on the reproduction control information and the encoded data row in the first section are decoded and stored; when an output time for the leading position of the first section is reached, the decoded data from the leading position of the first section is output while being faded out and the encoded data row in a second section between the edit-out point and an edit-in point is decoded and faded in; and when a time for output of the edit-in point is reached, the encoded data row following the second section is decoded and output.

According to another aspect of the present invention, the encoded data in the first section, to be doubly decoded, is decoded and stored before the edit point is reached, the encoded data in the second section between the edit-out point and the edit-in point is decoded while the decoded data in the first section is being output, and the decoded data in the second section is used to enable the decoding of data after the edit-in point.

The above object can also be accomplished by providing a recording medium having recorded therein signals produced through a produced in which before a time for output of an edit-out point is reached, a leading position of a first section consisting of encoded data row before the edit-out point is determined based on a reproduction control information recorded therein and an encoded data row in the first section is decoded and stored; when an output time for the leading position of the first section is reached, the encoded data row in a second section between the edit-out point and an edit-in point is decoded while the decoded data from the leading position of the first section is being output; and when a time for output of the edit-in point is reached, the encoded data row following the second section is decoded.

According to another aspect of the present invention, there is provided a recording medium having recorded therein signals produced through a procedure in which before a time for output of an edit-out point is reached, a leading position of a first section consisting of encoded data row before the edit-out point is calculated based on the reproduction control information and the encoded data row in the first section are decoded and stored; when an output time for the leading position of the first section is reached, the decoded data from the leading position of the first section is output while being faded out and the encoded data row in a second section between the edit-out point and an edit-in point is decoded and faded in; and when a time for output of the edit-in point is reached, the encoded data row following the second section is decoded.

BRIEF DESCRIPTION OF THE DRAWINGS

These objects and other objects, features and advantages of the present intention will become more apparent from the following detailed description of the present invention when taken in conjunction with the accompanying drawings, of which:

FIGS. 1A and 1B show an example of recorded data arrangement in a disc;

FIG. 2 shows an example of a data editing procedure in which a part of a data recorded in a disc;

FIGS. 8A to 8H show a time sequence of encoded video and audio data recorded in a disc, showing how a phase difference takes place between the video and audio signals;

FIGS. 14A and 14B illustrate together the decoding and display by the decoder used in the embodiment of the present invention;

DETAILED DESCRIPTION OF THE PREFERRED EMBODIMENTS

Figure 3A:
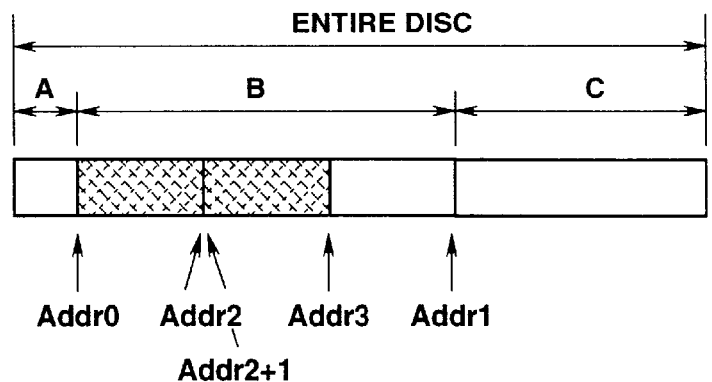
FIGS. 3A and 3B schematically illustrate results of a first technique of data edition.
Figure 3B:
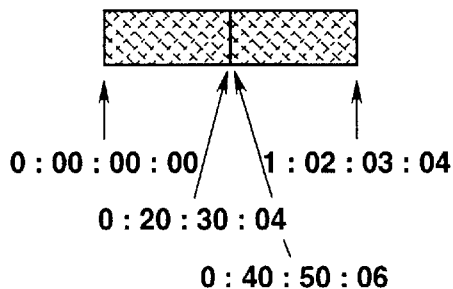
Figure 4A:
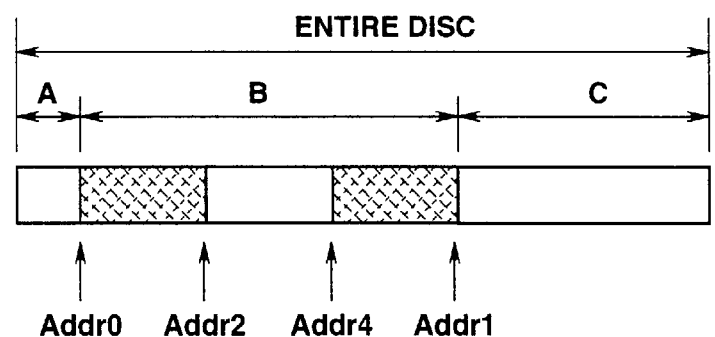
FIGS. 4A and 4B schematically illustrate results of a second technique of data edition.
Figure 4B:
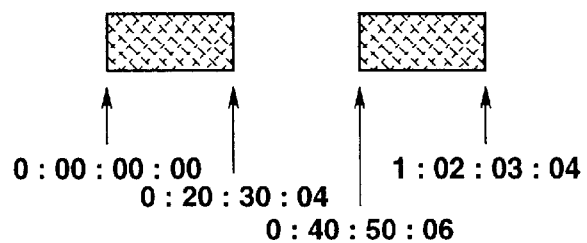
Figures 5A, 5B:
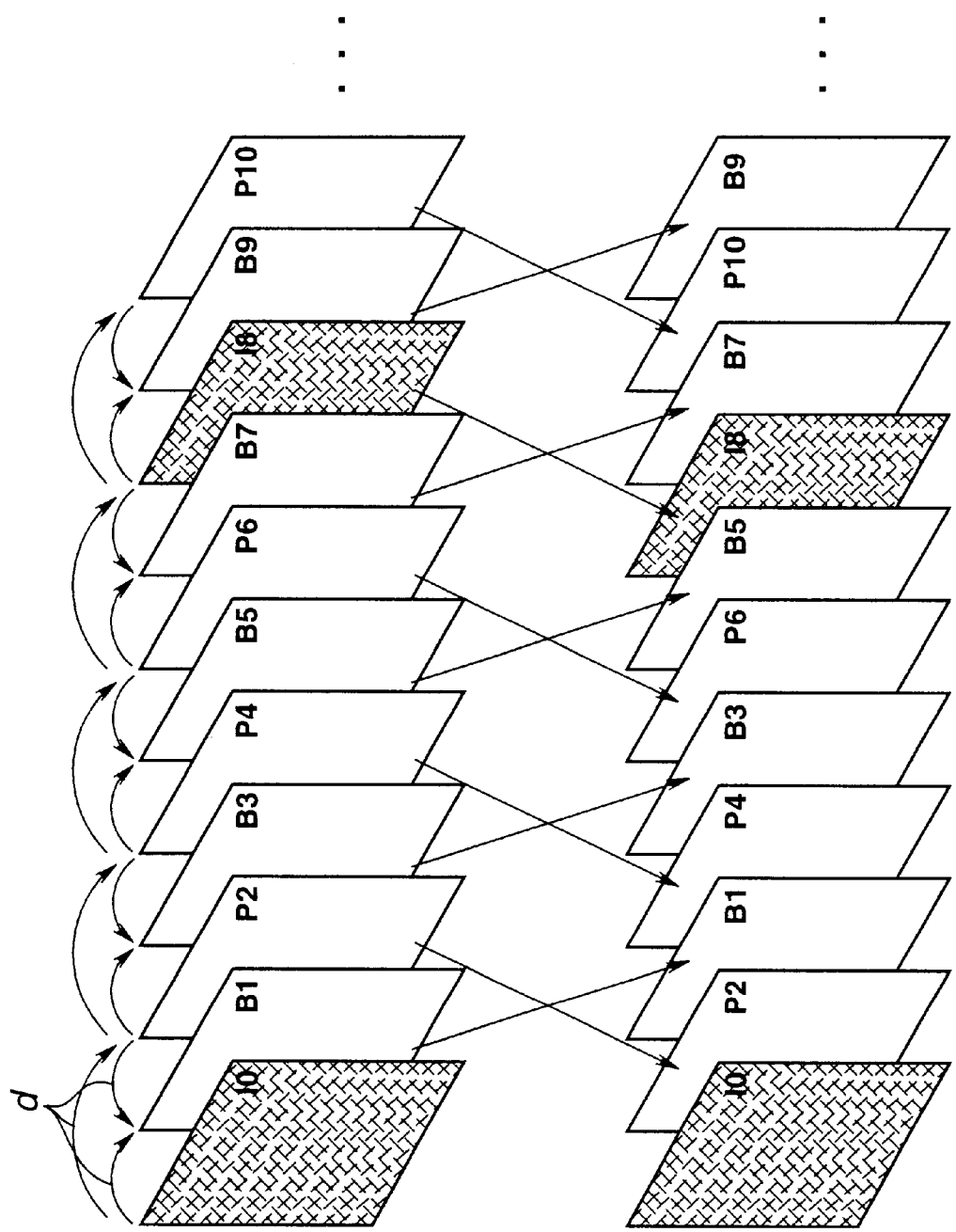
FIGS. 5A and 5B show together a combination of I, B and P pictures used in the MPEG standard.
Figure 6A:
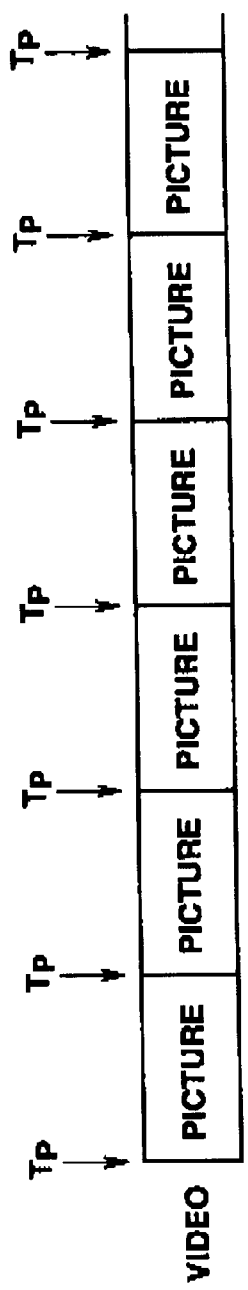
FIGS. 6A and 6B explain together periods of audio frame decoding and picture decoding.
Figure 6B:
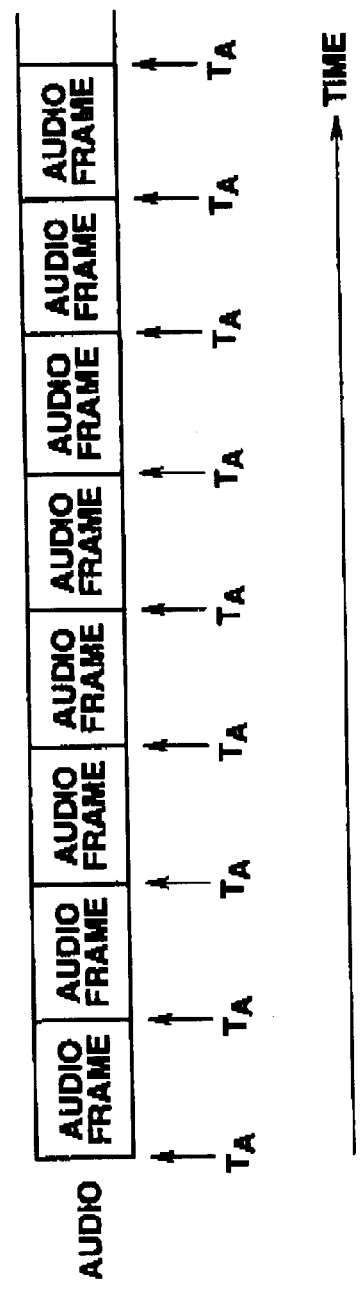
Figures 7A, 7B:
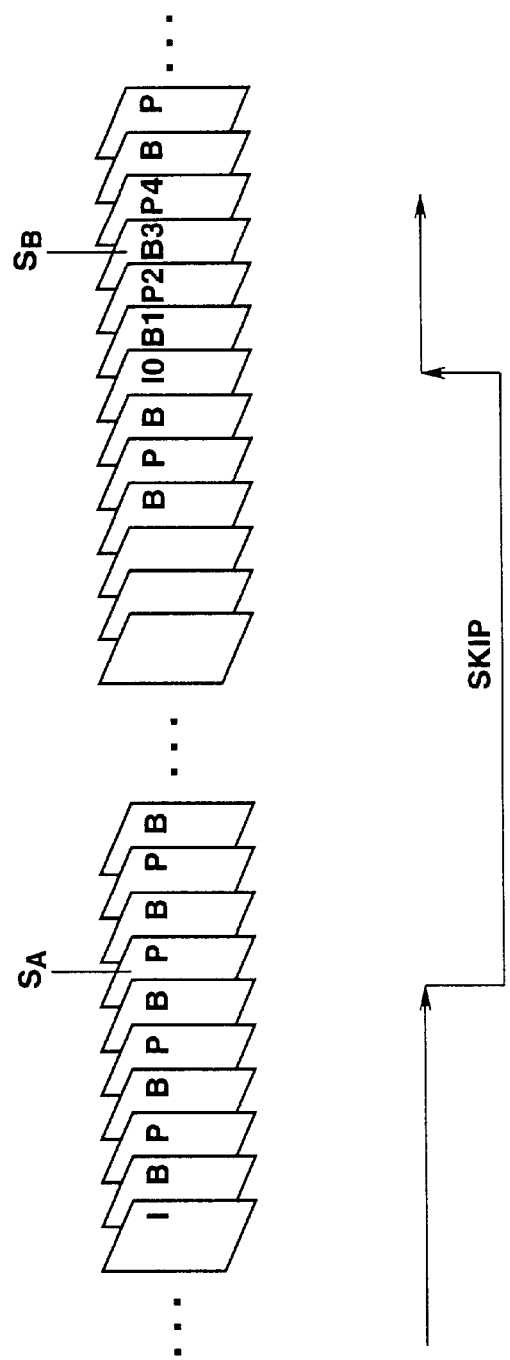
FIGS. 7A and 7B show a video stream and a skip during edition of the video stream.
Figure 9:
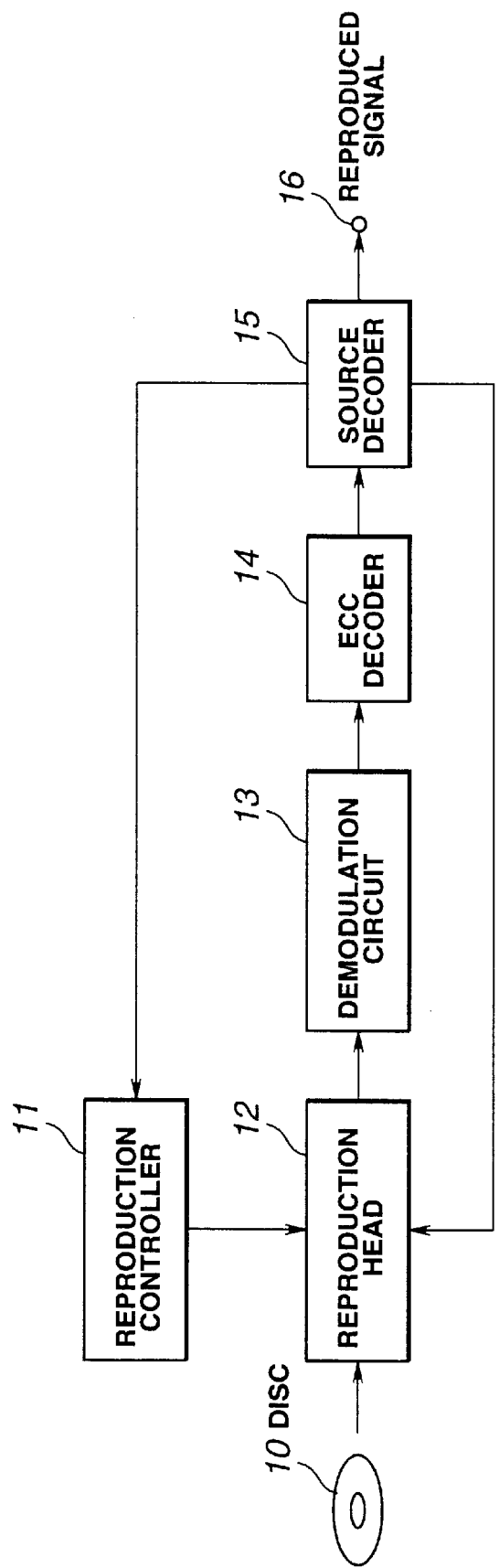
FIG. 9 is a block circuit diagram of an embodiment of the disc player according to the present invention, showing the essential elements of the disc player.

FIG. 9 is a schematic block circuit diagram of the disc player according to the present invention, adapted to play a disc having recorded therein an MPEG stream, for example, edited by the previously mentioned second editing method.

In FIG. 9, the disc is indicated with a reference 10 and has recorded therein an MPEG stream edited by the second editing method. The disc player comprises a reproduction head 12 which reads data from the disc 10. The read data is passed to a demodulator circuit 13 in which the data is subjected to a demodulation corresponding to the modulation applied to the data. The output from the demodulator circuit 13 is passed to an ECC decoder 14 in which it is subjected to an error correction. The output bit stream from the ECC decoder 14 is input to a source decoder 15. A reproduced signal decoded by the source decoder 15 is delivered at a terminal 16 of the source decoder 15. Also a reproduction controller 11 is provided to control the reading of data from the disc 10.

The configuration of the source decoder 15 in FIG. 9 will further be described with reference to FIG. 10.

Figure 10:
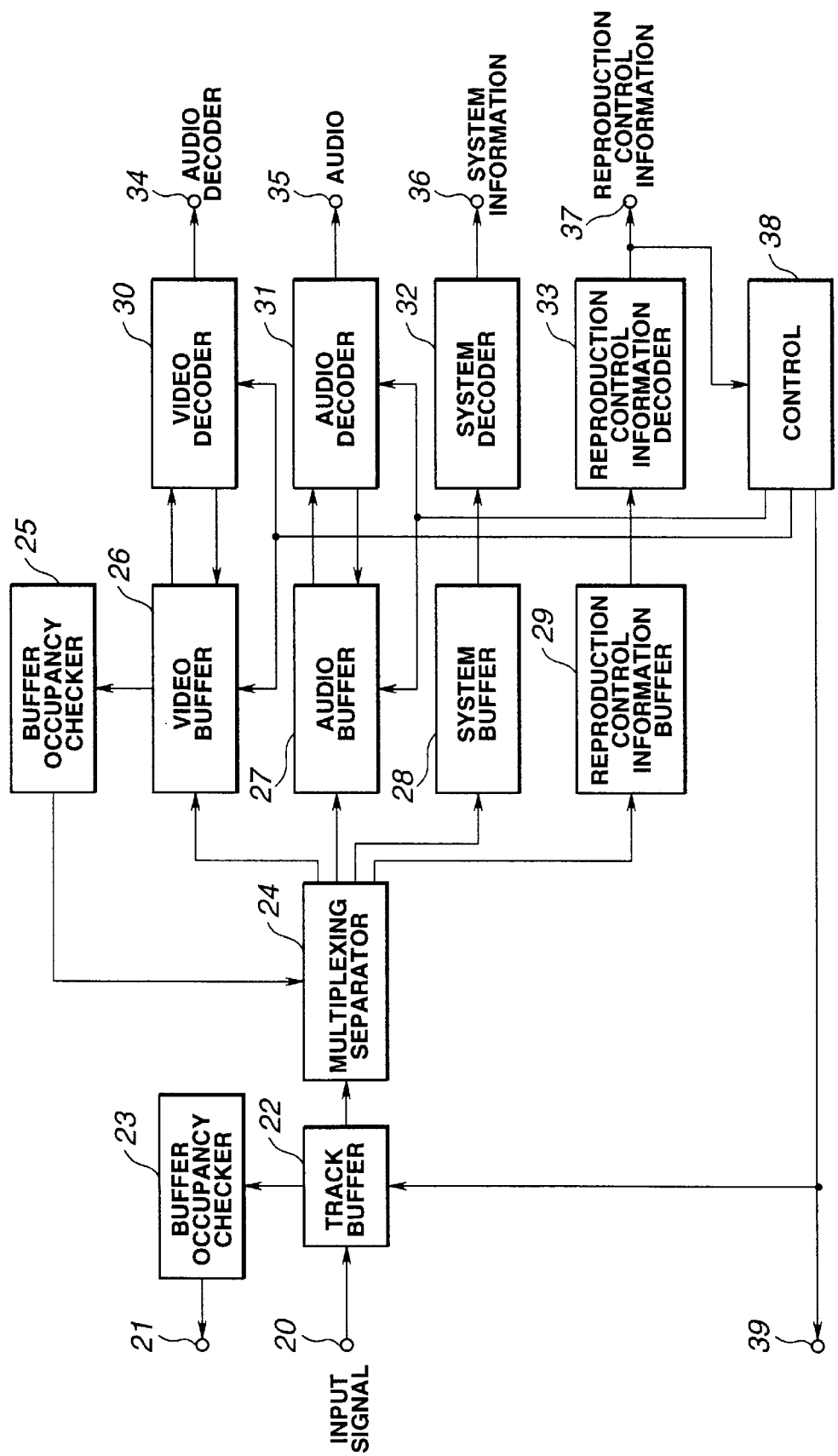
FIG. 10 is a block circuit diagram showing in detail the source decoder included in the disc player in FIG. 9.

As seen from FIG. 10, the bit stream supplied at a terminal 20 of the source decoder 15 is passed to a track buffer memory 22 where it is stored once, and read for delivery to a multiplexing separator 24.

In the bit stream input to the multiplexing separator 24, an encoded video signal (video stream), an encoded audio signal (audio stream), a system signal, a reproduction control information, etc. are time-division multiplexed. Note that the system signal includes an A/V synchronization information for the video and audio signals, etc. Also, the reproduction control information includes an information indicative of a reproduction route for a video stream which is to be recorded into the disc, a TOC information for use in edition as will be described later, an information before an edit-out point, an information after an edit-in point, etc. It should be noted that the reproduction route is given by the user during an editing procedure. The information for use for the edition will be described later.

The multiplexing separator 24 separates the supplied multiplexed bit stream into a video stream, audio stream, system signal and reproduction control information, and supplies the signals thus separated to a video buffer memory 26, audio buffer memory 27, system buffer memory 28 and reproduction control information buffer memory 29, respectively.

As seen, a video decoder 30 is also provided to read and decode data from the video buffer memory 26, and deliver a reproduced video signal. Also an audio decoder 31 is provided to read and decode data from the audio buffer memory 27, and deliver a reproduced audio signal. The video buffer memory 26 functions as a frame memory for at least one GOP (Group of Pictures) and can store even a video data decoded by the video decoder 30. Also, the audio buffer memory 27 is adapted to store a plurality of audio frames as will be described later, and also an audio data decoded by the audio decoder 31.

A system decoder 32 is provided to read data from the system buffer memory 28, and decode it to provide a reproduction control information. A reproduction control information decoder 33 is also provided to read data from a reproduction control information buffer memory 29 and decodes it to provide a reproduction control information. Of the reproduction control information, an information indicative of the reproduction route is input to the reproduction controller 11 in FIG. 9, and an information for use in the edition is passed to the video decoder 30 and audio decoder 31.

A buffer occupancy checker 25 is also provided to check the bit occupancy of the video buffer memory 26. When it is found that the video buffer memory 26 is full, a signal indicating it is supplied from the checker 25 to the multiplexing separator 24 which is thus let to stop the separating operation. As a result, the video buffer memory 26 will not be supplied with any further bit stream.

Also a buffer occupancy checker 23 is provided to check the bit occupancy of the track buffer memory 22. When it is found that the memory 22 is full, a signal indicating it is supplied from the checker 23 to the reproduction head 12 of the disc player in FIG. 9 to stop the head 12 from reading data from the disc 10. As a result, the track buffer memory 22 is not supplied with any further bit stream.

A control circuit 38 is provided to control write into, and read from, the video and audio buffer memories 26 and 27 based on the editing information of the reproduction control information, and also decoding operations of the video and audio decoders 30 and 31. Furthermore, the control circuit 38 controls various kinds of calculation, the track buffer memory 22, the reproduction controller 11 via a terminal 39, and others. The operations of this control circuit 38 will be described in detail later.

Figure 11:
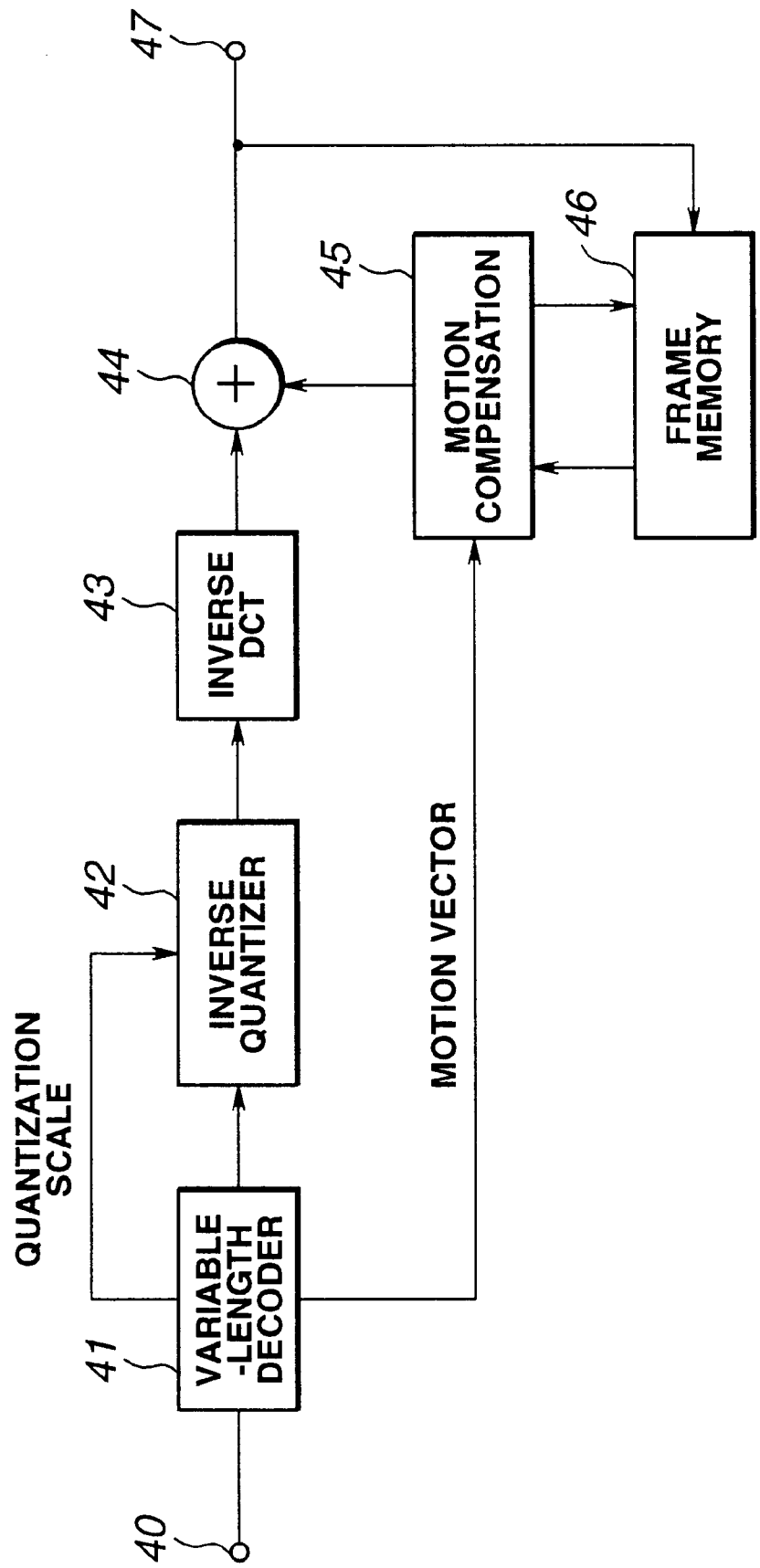
FIG. 11 is a block circuit diagram showing in detail the video decoder included in the disc player in FIG. 9.

FIG. 11 schematically illustrates the configuration of the video decoder 30.

As shown in FIG. 11, a data (encoded data) is input to a terminal 40 of the video decoder 30 from the video buffer memory 26. The encoded data is a video data derived from a DCT (discrete cosine transform), quantization, and variable-length coding of a differential image in an encoder, and it includes as sub-information at least a quantizing scale information used in the quantization and a motion vector. The encoded data is passed to a variable-length decoder circuit 41.

In the variable-length decoder circuit 41, the encoded data is subjected to a variable-length decoding to provide a quantized data and also a quantizing scale information and motion vector included in the encoded data.

An inverse quantizer circuit 42 is also provided which uses the quantizing scale to inversely quantize the quantized data to provide a DCT coefficient data.

An inverse DCT circuit 43 is provided to effect an inverse DCT of the DCT coefficient data to produce a differential image data for delivery to an adder 44.

The adder 44 is also supplied with an image data motion-compensated with the motion vector and a preceding frame image reserved in a frame memory 46 by a motion compensator circuit 45, and adds together the differential image data and an image data from the motion compensator circuit 45.

The image data supplied from the adder 44 is delivered at a terminal 47 of the adder 44 and stored into the frame memory 46.

The frame memory 46 is incorporated in the video buffer memory 26 in FIG. 10.

The following description concerns a processing (control by the control circuit 38) of an MPEG stream, for example, at a connecting point (edit point) for seamless connection of streams one before an unnecessary part over which skip is to made as having previously been described, during reading, by the disc player configured as mentioned above, of a disc having recorded therein the MPEG stream having been edited by the second editing method. It should be noted that the seamless connection (seamless reproduction) is typically to connect to each other reproduced signals from the two decoders operated in an operative coupling with each other. One of such seamless connection techniques is disclosed in the specification and drawings of the Japanese Unexamined Patent Publication No. H8-335668 entitled "Digital Signal Decoding Method and Apparatus, and Digital Signal Reproducing Apparatus". The technique proposed in the specification and drawings is one of the solutions very effective for the seamless reproduction. The present invention proposes a solution other than the above Japanese Unexamined Patent Publication.

Figure 12A:
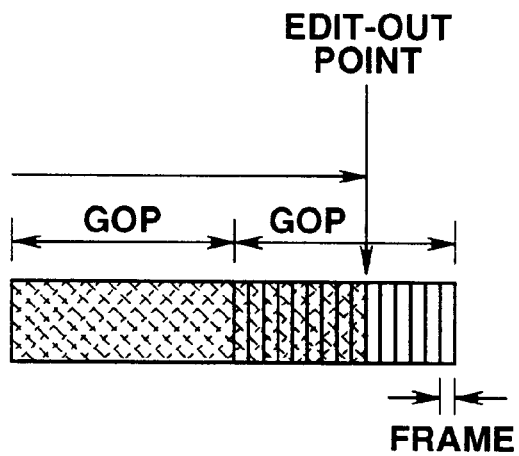
FIGS. 12A and 12B show together an example of edition in which two video streams are connected to each other at the time of reproduction.
Figure 12B:
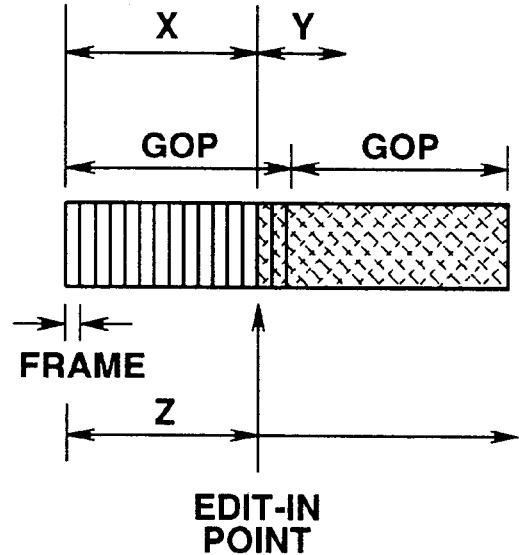

First, the processing of the MPEG video at the time of disc reproduction will be discussed in detail below:

It is assumed here that a reproduction by which a video stream shown in FIG. 12A and a video stream shown in FIG. 12B are connected to each other at edit-in and -out points is designated with the reproduction control information. Note that in the example of seamless connection of video streams shown in FIG. 12, a video stream from a part before the edit-in point down to a middle point of a last GOP (group of pictures) including the edit-out point (frames (pictures) down to the edit-out point), as shown in FIG. 12A and a video stream after a frame at the edit-in point of GOP including the edit-out point, as shown in FIG. 12B, are connected to each other. It should be noted that a section indicated with a reference Y in FIG. 12B is an unnecessary part of the video stream for the decoding according to the MPEG in the GOP including the edit-out point, say, a part consisting of pictures not referenced to, and a section indicated with a reference Z in FIG. 12B is a necessary part for decoding and display of frames following the edit-in point in the GOP including the edit-in point. Also, a section indicated with a reference X is a part decoded and displayed at a same time as the decoding of the section Z.

Figure 13A:
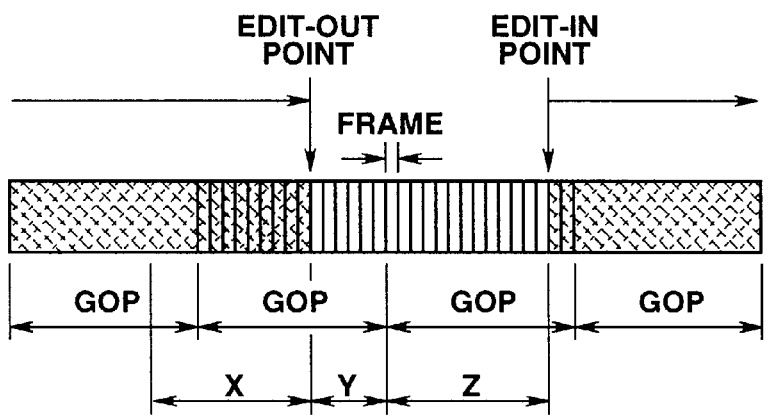
FIGS. 13A and 13B show together an example of stream input to a decoder configured for adopting the second editing method in the embodiment of the disc player according to the present invention.
Figure 13B:
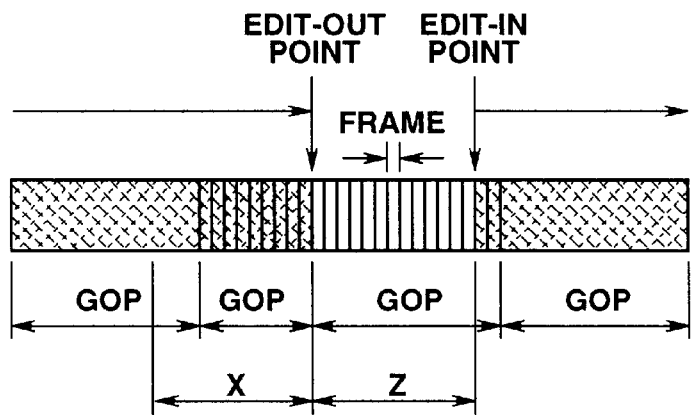

In this embodiment, the stream input to the decoder (stream entered to a video signal processor of the source decoder 15 of the disc player in FIG. 9) is as shown in FIG. 13A and includes an unnecessary part as well, over which skip is to be made at the time of reproduction. However, the section Y over which skip is to be made, as shown in FIG. 13, is not used for reference to the subsequent pictures, thus it is not necessary. Therefore, before entry to the source decoder 15, each frame after the edit-out point in the GOP including the edit-out point, for example, as shown in FIG. 13B, may be deleted.

For reproduction of a stream as shown in FIG. 13 by the disc player, TOC of the disc 10 or a stream to be reproduced should include, as the reproduction control information, a TOC information for use in the edition, information before and after an edit-out point, and information before and after an edit-in point.

The information before the edit-out point includes a time code for a frame at the edit-out point (or an ID for identification of the frame) and an information indicative of the order of the frame at the edit-out point as counted from the top of the GOP. The information on the order of the frame may be described as it is, or may be determined by subtracting a time code indicative of the leading frame in the GOP including the edit-out point and described anywhere from a time code indicative of a frame at the edit-out point.

The information after the edit-in point includes a time code for a frame at the edit-in point (or an ID for identification of the frame) and an information indicative of the order of the frame at the edit-in point as counted from the top of the GOP. The information on the order of the frame may be described as it is, or may be determined by subtracting a time code indicative of the leading frame in the GOP including the edit-in point and described anywhere from the time code indicative of the frame at the edit-in point.

The source decoder 15 in FIG. 9 to decode the above-mentioned stream in practice is designed to have a higher decoding capability than a conventional source decoder, and the video buffer memory (frame memory) 26 is also designed to have a capacity for a maximum of frames (pictures) in one GOP, for example. In this case, it is necessary to limit the maximum number of frames in GOP.

The conventional decoder has a decoding capability for one frame for one frame time. This embodiment has a decoding speed exceeding by one frame the one frame time if it is possible to define an interval between the edit-out point and edit-in point. Namely, the decoding speed is such that the section X used at a next edit point can be stored in the video buffer memory 26 for a time interval between two edit points. The decoded video data in the section X before the edit-out point is previously stored as a display data for a decoding time necessary for display of the edit-in point. Also, in this embodiment, the video buffer memory 26 has a capacity for a GOP (frames in one GOP at maximum). The conventional decoder should ideally have a capacity for two frames, and has 2.5 or 3 frames in practice.

Because of the decoder configuration having been described in the foregoing, a part to be doubly decoded can be pre-decoded for storage in the video buffer memory 26 before the display position reaches an edit point, as shown in FIG. 14A. Thus, the double decoding is possible.

Note that the actual decoding and display will be done as shown in FIG. 14B. That is to say, in an actual decoding, the leading position of the section X in FIG. 14B is calculated from an information included in the TOC or stream. In display, the top of the section X falls at the same position as the leading position of the section Z in FIG. 14B. Also, before the calculated leading position of the section X, data in the section X is supplied and decoded for storage into the video buffer memory 26.

Next, when the leading time of the section X (also the leading time of the section Z) has come, the data in the section Z is decoded while the data in the section X stored in the video buffer memory 26 is being delivered. Upon completion of the decoding of the data in the section X (and section Z), the stream after edited is decoded and delivered following the data in the section Z being decoded.

Also, the source decoder 15 can be otherwise configured to have a higher capability of decoding, and the video buffer memory 26 can be designed to have a capacity at least two times higher than that of the convention video buffer memory. Note that the capability of decoding in this case is made at least two times higher than the present one.

Owing to the above-mentioned other configuration of the source decoder 15, a section whose data is to be doubly decoded can be subjected directly to a data decoding.

Figure 15A:
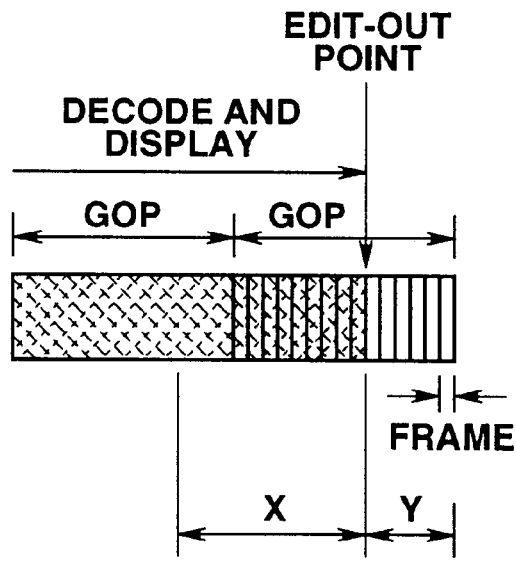
FIGS. 15A and 15B illustrate together the decoding and display by another decoder configuration in the embodiment of the present invention.
Figure 15B:
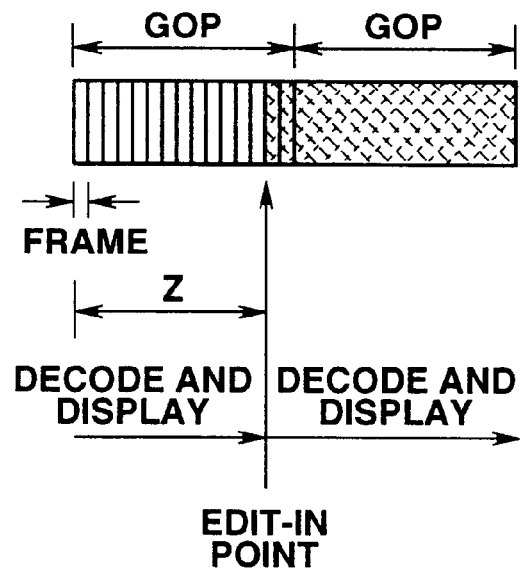

The decoding and display by the source decoder 15 having the other configuration are effected as shown in FIGS. 15A and 15B.

More particularly, in the decoding shown in FIG. 15, first the leading position of the section Z is calculated from the information in TOC or stream. The leading position of the section X falls at a same time as the leading position of the section Z in FIG. 15. Also, supply and decoding of data in the section Z are started at a same time as the calculated leading position of the section X. So long as the section X lasts, the result of the data decoding of the section X is displayed. Upon completion of the data decoding of the sections X and Z, the decoding of the data in the section X is stopped. At this time, the processing of the edit point is terminated. Thereafter, a part following the section X will be decoded and displayed.

Figures 16A, 16B:
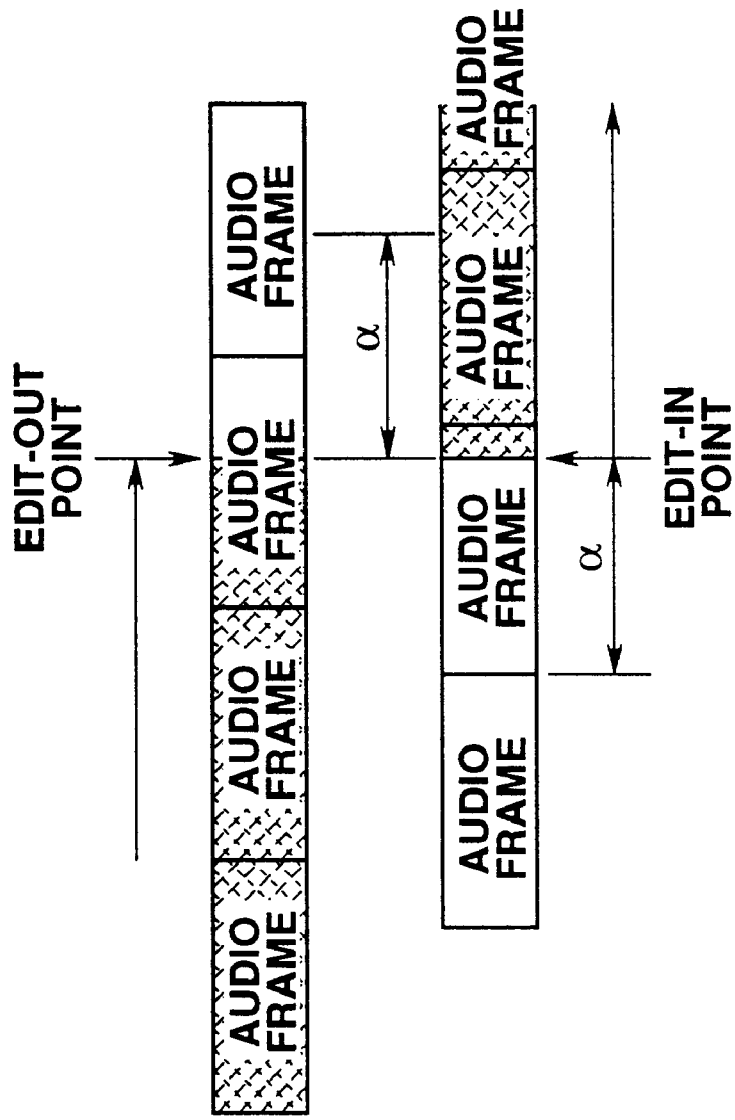
FIGS. 16A and 16B show together an example of edition in which two audio streams are connected to each other at the time of reproduction.

Now, processing of compressed audio signal at the time of disc reproduction, and inter-frame phase difference between two audio streams connected to each other, will be described in detail herebelow:

It is assumed here that a reproduction of an audio stream as shown in FIG. 16 is designed with an edit-out point and an edit-in point. Namely, assume that the audio stream shown in FIG. 16A is interrupted at the edit-out point, for example, and that a reproduction by which audio streams shown in FIG. 16B are connected to each other at the edit-in point. In the example shown in FIG. 16, a data from a part before the edit-out point to a middle of an audio frame including the edit-out point (data down to the edit-out point) as shown in FIG. 16A, and a data after the middle of the audio frame after the edit-in point (data from the edit-in point), are connected to each other for no seam between them.

For connecting audio streams to each other, a part not the beginning or end of one audio frame in an audio stream will be followed by a part also not the beginning or end of one audio frame in another audio stream, which is very similar to the concept of the GOP in the aforementioned connection of video streams.

Figures 17A, 17B:
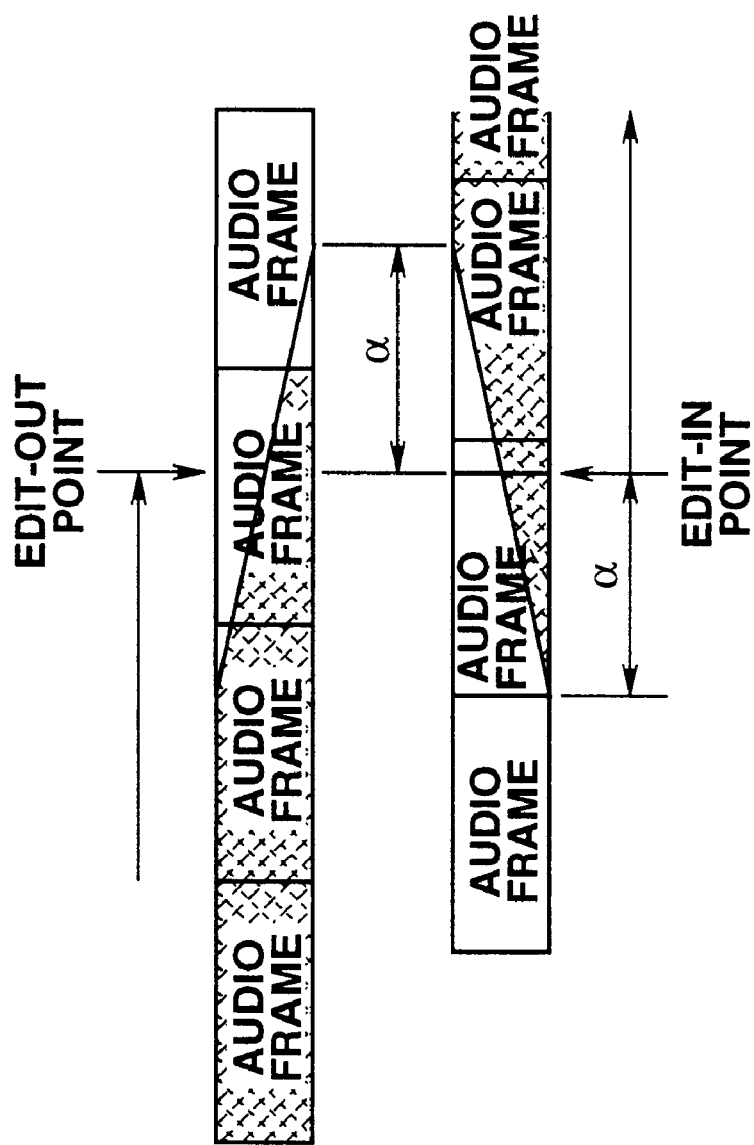
FIGS. 17A and 17B illustrate a cross fade to be effected when the audio streams are connected.

However, such a switching from one audio frame to another is not satisfactory for this connection between audio streams but it is necessary to suppress the output noise by making a cross fade or the like at the connection between the audio streams. For example, a cross fade is done for periods of time $\alpha$ before and after the edit-out and -in points, respectively. More particularly, a product of a coefficient whose value decreased gradually, from 1 to 0, for example, for the time $\alpha$ and an audio signal after decoded, as shown in FIG. 17A, and a product of a coefficient whose value increases gradually, from 0 to 1, for example, reversely to the coefficient shown in FIG. 17A and an audio signal after decoded, as shown in FIG. 17B, are added together to provide a reproduced signal, whereby the noise at the connection is suppressed.

At this time, an audio data for the time $\alpha$ after the connection (edit-out point) is required for an audio stream before the connection, and an audio data for the time $\alpha$ before the connection (edit-in point) is required for an audio stream after the connection.

In this embodiment, the disc has recorded therein an audio data of a format-defined value for the time a, and the disc player is adapted to use the audio data for a length smaller than the format-defined value.

Audio data is input to the source decoder 15 in practice as shown in FIG. 17. More particularly, in the example shown in FIG. 17, the audio decoder 31 in the source decoder 15 decodes audio frames including one additional one before an audio frame including the edit-out point while decoding audio frames including one additional one after am audio frame including the edit-in point.

For supplying and decoding such audio frames, the aforementioned TOC information, information before and after the edit-out point should be included in the TOC or stream.

It should be noted that the TOC information required for connecting audio streams to each other is a value indicative of the above time $\alpha$ (of which the maximum value is format-set, edited by an editing machine and recorder so that an audio frame including its audio sample is left, and processed by the player with a value determined by the player itself). The information before the edit-out point is a time information indicating the last audio sample of an audio fame including the edit-out point (a sample at the edit-out point), and the information after the edit-in point is a time information indicating the first audio sample of an audio frame including the edit-in point (a sample at the edit-in point).

For the above audio stream, the audio decoder 31 for actual decoding has a higher capability of decoding than the conventional decoder and has a memory for storage of audio data in the overlapping of two streams where cross fade is made at the connection. The memory is also incorporated in the audio buffer memory 27.

The audio decoder 31 decodes the audio data in the above overlapping portions before the edit-out point is reached, and stores it into the above-mentioned memory. Also at the overlapping portions, output audio data before the edit-out point and after the edit-in point are multiplied by a coefficient for the cross fade and added together for output while audio data after the edit-in point are being decoded.

Also the audio decoder 31 may be otherwise configured to have a decoding capability two times higher than the conventional decoder, decode audio data in the audio streams connected to each other at the overlapping portions thereof, and output while adding, while multiplying, the two audio data after decoded by a coefficient for cross fade as in the above.

Since in two audio streams to be connected to each other, a phase difference may possibly take place between audio frames at the connection between the audio streams, a solution against the inter-frame phase difference will be described herebelow:

To this end, the audio decoder 31 of the source decoder 15 is configured to decode the data before the edit-out point asynchronously with the decoding of the data after the edit-in point. This is also true for the aforementioned two approaches. Upon completion of the decoding of the data before the edit-out point, decoding is started synchronously with the phase after the edit-in point. For this purpose, the maximum value of the format-defined time $\alpha$ for which the audio streams overlap each other has to be set taking the magnitude of the inter-frame phase difference in consideration.

There is a problem of a phase difference in multiplexing a video stream and an audio stream (this phase difference will be referred to as "multiplexing phase difference" herebelow for distinction from the phase difference between audio phases).

In the disc player, the video buffer memory 26 and audio buffer memory 27 are provided between the multiplexing separate 24 and video decoder 30 and between the multiplexing separator 24 and audio decoder 31, respectively. The buffer memories 26 and 27 are allowed a delay of up to 1 sec, respectively.

Thus, if there are two elementary streams multiplexed as in this embodiment, one being a video stream while the other is an audio stream, the following extreme cases are possible. That is, only the multiplexing-separated video stream has a large delay in one case. In the other case, only the multiplexing-separated audio stream has a large delay.

Figure 18:
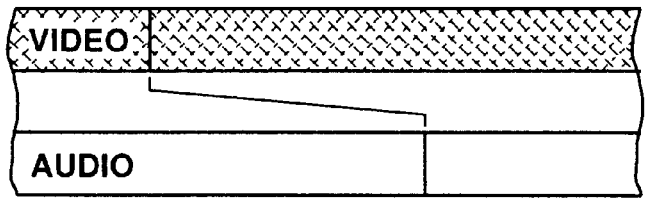
FIG. 18 illustrates an example of multiplexed stream in which only video stream has a large delay.

In case only the video stream separated by multiplexing has a large delay, it has been multiplexed before the audio stream, namely, the audio stream has been multiplexed rather later than the video stream. Therefore, the video data will be input to the video buffer memory 26 before the audio data is input to the audio buffer memory 27, and will stay around 1 sec longer in the video buffer memory 26 than the audio data in the audio buffer memory 27, as will be seen from FIG. 18.

Figure 19:
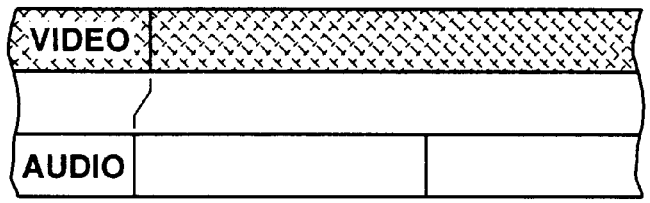
FIG. 19 shows an example of multiplexed stream in which only audio stream has a large delay.

On the other hand, in case only the audio stream separated by multiplexing has a large delay, it has been multiplexed before the video stream, namely, the video stream has been multiplexed rather later than the audio stream as shown in FIG. 19. Therefore, the audio data will be input to the audio buffer memory 27 more early than the video data input to the video buffer memory 26, and will stay longer in the audio buffer memory 27 than the video data in the audio buffer memory 26, as will also be seen from FIG. 19.

Necessary information and processing to cope with the above will be described below:

For example, it is assumed that mainly the video stream is cut out for data edition rather than the audio stream. It should be noted that mainly the audio stream may be cut, which will not be any problem. There is no substantial difference between them. However, the cutting of video stream is more preferred from the standpoint that the data edition is designated with a time code and video frame ID as well as because of the processing to be done when the edit points are encountered. Also location in different positions of audio information to be pronounced synchronously with display of corresponding video information will be a problem if mainly the video (or audio) stream is cut out for edition. To avoid this, it is necessary to acquire only a minimum necessary and sufficient amount of data into the buffer memory while deleting unnecessary portion.

The solutions to the above problems will be considered as to two phases before the edit-out point and after the edit-in point, respectively:

The processing to be done of data before the edit-out point will first be discussed below.

Figure 20:
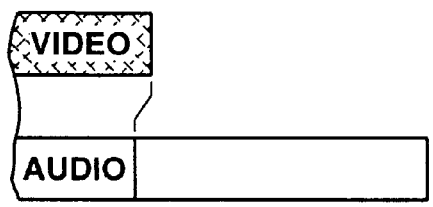
FIG. 20 shows an example of multiplexed stream in which the video stream has a large delay.

If the video stream has a large delay (the video stream is multiplexed earlier) as shown in FIG. 20, some approaches are possible for acquisition of a necessary audio data as in the following:

For example, an excessive audio data for a time of more than 1 sec after the discontinuity of a video stream can be read from the disc 10 into the track buffer 22. For this purpose, a time stamp, SCR (System Clock Reference: a bit stream supply time defined for the MPEG stream) or the like is used to search a read stop position. For example, a PTS (Presentation Time Stamp: display time defined for the MPEG stream multiplexing) of a last video stream is held to read audio data into the track buffer 22 until an audio frame having a PTS equal to or somewhat larger than the held PTS. Alternatively, a necessary position for read-out of a minimum necessary and sufficient amount of audio data is recorded in TOC or stream before reproduction such as during recording or edition. The disc player reads the value for the position beforehand and reads data from the disc down to that position during a processing done at an edit point.

Also, video data immediately before the edit point may be input to the video decoder 30 via the video buffer memory 26 and a necessary audio data potion be extracted from the excessive data and input to the audio decoder 31 via the audio buffer memory 27. For the extraction of the necessary audio data portion as in the above, a PTS may be used or a position be recorded beforehand. More particularly, a PTS for a last video stream is held, and audio data is input to the audio decoder 31 via the audio buffer memory 27 until a PTS equal to or slightly larger than the held PTS is found. Namely, a necessary position for read-out of a minimum necessary and sufficient amount of audio data is recorded in TOC or stream before reproduction such as during recording or edition. The disc player reads the value beforehand, and audio data is input to the audio decoder 31 via the audio buffer memory 27 down to that position during decoding. Alternatively, a PTS corresponding to each frame is checked immediately before audio decoding is done, and skip is made over the audio data when the PTS checking shows no necessity of decoding the data.

Figure 21:
FIG. 21 shows an example of multiplexed stream in which the audio stream has a large delay.

Next, the procedure to follow when the audio stream has a large delay (the video stream has been multiplexed later) as shown in FIG. 21 will be described below:

In this case, only a necessary video data is read so that a necessary audio data is loaded to the track buffer 22. Video data just before the edit point is input to the video decoder 30 via the video buffer memory 26, and a necessary audio component is extracted from the excessive data and supplied to the audio decoder 31 via the audio buffer memory 27. For the extraction of the necessary audio component, a PTS may be used or a position be recorded as having been described in the foregoing.

Possible actual implements are as follows:

First, also if the audio stream has a large delay, application of the approach for the video stream of a large delay allows to load necessary audio data. In this case, the procedure for the case that the video stream has a large delay is applied with no consideration to which has a larger delay, audio or video stream.

Secondly, at the time of recording or edition, it is detected beforehand which has a larger delay, the audio or video stream, and the result is recorded in TOC or stream. The disc player is adapted to have this information in advance, and effect any of the above algorithms according to the information.

The processing to be done of data after the edit-in point will be discussed herebelow.

Figure 22:
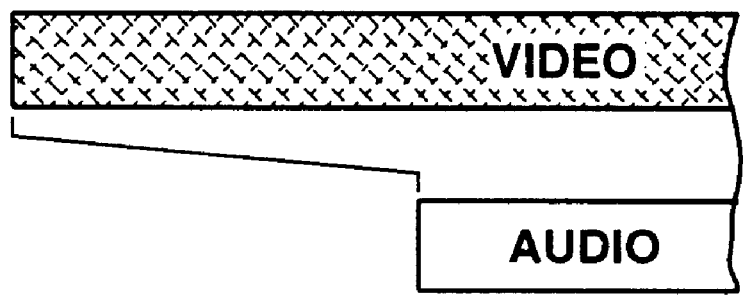
FIG. 22 shows an example of multiplexed stream in which the video stream has a large delay.

The procedure to follow when the video stream has a large delay (the video stream has been multiplexed earlier) as shown in FIG. 22 will be described below:

In this case, only a necessary video data is read so that a necessary audio data is loaded to the track buffer 22. Next, video data just before the edit-in point is input to the video decoder 30 via the video buffer memory 26, and a necessary audio component is extracted from the excessive data and input to the audio decoder 31 via the audio buffer memory 27. For the extraction of the necessary audio component, a PTS may be used or a position be recorded as having been described in the foregoing. That is, with the PTS of the first video stream held, skip is made over data until an audio frame having a PTS equal to or somewhat larger than the held PTS is encountered. When an audio frame meeting the requirements is found, decoding is started. At this time, problems as to the phase difference and audio data edit point are solved as in the above. More particularly, a necessary position for read-out of a minimum necessary and sufficient amount of audio stream is recorded in TOC or stream before reproduction such as during recording or edition. The disc player reads the value for the position beforehand and skips over data down to that position during a processing done at an edit point. When the designated position is reached, audio frames after that position are input to the audio decoder 31 via the audio buffer memory 27 and decoding is started.

Figure 23:
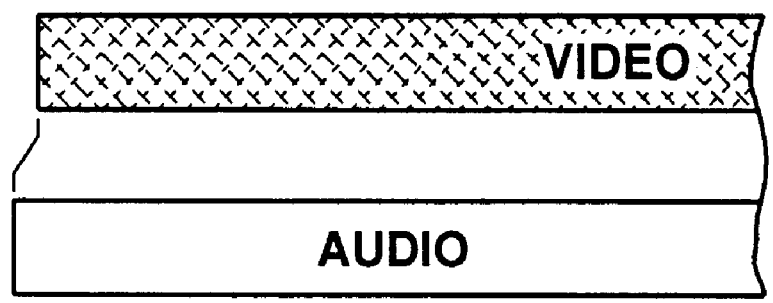
FIG. 23 shows an example of multiplexed stream in which the audio stream has a large delay.

Next, the procedure to follow when the audio stream has a large delay (the video stream has been multiplexed later) as shown in FIG. 23 will be described herebelow.

In this case, some approaches are possible for acquisition of a necessary audio data as in the following:

For example, an excessive data for a time of more than 1 sec before the discontinuity of a video stream is read from the disc 10 into the track buffer 22. For this purpose, a read start position may be searched by using a time stamp to check a necessary location or searching as in a time code searching procedure. Actually, data for the extra time of 1 sec is not required. A maximum delay developed in the audio buffer memory 27 is obtained by dividing the capacity of the buffer memory 27 by the bit rate, and data read is started at a position the result of the division before the discontinuity of the video stream. Alternatively, a necessary position for read-out of a minimum necessary and sufficient amount of audio data is recorded in TOC or stream before reproduction such as during recording or edition. Also in this case, the disc player reads the value for the position beforehand and reads data from the disc down to that position during a processing done at an edit point. Video data immediately before the edit point is input to the video decoder 30 via the video buffer memory 26, and a necessary audio data component is extracted from the excessive data and input to the audio decoder 31 via the audio buffer memory 27.

Possible actual implements are as follows:

First, also if the video stream has a large delay, application of the approach for the audio stream of a large delay allows to load necessary audio data. In this case, the procedure for the case that the audio stream has a large delay, is applied with no consideration to which has a larger delay, audio or video stream.

Secondly, at the time of recording or edition, it is detected beforehand which has a larger delay, the audio or video stream, and the result is recorded in TOC or stream. The disc player is adapted to have this information in advance, and effect any of the above algorithms according to the information.

It should be noted that the edited signal generated by the disc player according to the present invention may further be recorded into a recording medium such as an optical disc, hard disc or the like.

In addition, it is considered that for edition of the MPEG stream before recording into the disc, the following four items should be solved also for processing data stream at the edit point. The items include an MPEG video handling, compressed audio handling, inter-frame phase difference, and multiplexing phase difference. However, they are not important to the present invention, and so will not further be discussed.

As evident from the foregoing description, the present invention decodes and stores encoded data row in a first section before a time for output of an edit-out point is reached, outputs the decoded data from the leading position of the first section and decodes the encoded data row in a second section when an output time for the leading position of the first section is reached, decodes and outputs encoded data row following the second section when a time for output of an edit-in point is reached, to interrupt a data stream whose redundancy has been eliminated by using the continuity of the MPEG video, for example, thereby permitting to well connect the data stream with another data stream.

Also, the present invention decodes and stores encoded data row in a first section before an output time for an edit-out point is reached, outputs, while fading out, the decoded data from a leading position of the first section when an output time for the leading position of the first section is reached and decodes and fades in encoded data row in a second section, and decodes and outputs encoded data row following the second section when an output time for an edit-in point is reached, to interrupt a data stream whose redundancy has been eliminated by using the continuity of the MPEG video, for example, thereby permitting to well connect the data stream with another data stream.

What is claimed is:

1. A method for reading an encoded data row consisting of a succession of predetermined encoded data groups comprising a plurality of frames, and reproduction control information including information on an edit-out point and edit-in point, respectively, having been used in data edition, from a random-accessible recording medium having recorded therein at least the encoded data row and reproduction control information, and decoding the read encoded data row based on the reproduction control information, comprising the steps of:

determining based on the reproduction control information a leading position of a first section including an edit-out point and consisting of encoded data row before the edit-out point before a time for output of the edit-out point is reached;

reading and decoding the encoded data row in the first section before an output time for the edit-out point is reached, and storing the decoded data;

decoding, when an output time for the leading position of the first section is reached, the encoded data row in a second section between the edit-out point and an edit-in point while outputting the decoded data from the first section; and decoding and outputting the encoded data row following the second section when a time for output of the edit-in point is reached.

2. The method according to claim 1, wherein the reproduction control information includes a management table information recorded in a predetermined position on the recording medium, information before the edit-out point and information after the edit-in point.

3. A decoding player for reading an encoded data row consisting of a succession of predetermined encoded data groups comprising a plurality of frames and reproduction control information including information on an edit-out point and edit-in point, respectively, having been used in data edition, from a random-accessible recording medium having recorded therein at least the encoded data row and reproduction control information, and decoding the read encoded data row based on the reproduction control information, comprising:

storing means having a storage capacity for at least one of the predetermined encoded groups; and means of controlling, based on the reproduction control information, the reading from the recording medium and the decoding of the read data, the controlling means being adapted to:

determine, based on the reproduction control information, a leading position of a first section including the edit-out point and consisting of encoded data row, before the edit-out is reached, read and decode the encoded data row in the first section before an output time for the edit-out point reached, and stored the decoded data into the storing means, read from the recording medium and decoded the encoding data row in a second section between the edit-out point and edit-in point while outputting the decoded data from the first section when an output time for the leading position of the first section is reached, and read from the recording medium and decode for output of the encoded data row following the second section when an output time for the edit-in point is reached.

4. The decoding player according to claim 3, wherein the reproduction control information includes a management table information recorded in a predetermined position on the recording medium, information before the edit-out point and information after the edit-in point.

5. A method for reading an encoded data row consisting of a succession of frames, and reproduction control information including information on an edit-out point and edit-in point, respectively, having been used in data edition, from a random-accessible recording medium having recorded therein at least the encoded data row and reproduction control information, and decoding the read encoded data row based on the reproduction control information, comprising the steps of:

determining based on the reproduction control information a leading position of a first section including an edit-out point and consisting of encoded data row before the edit-out point before a time for output of the edit-out point is reached;

reading and decoding the encoded data row in the first section before the output time for the edit-out point is reached, and storing the decoded data;

outputting, while fading out, when the output time for the leading position of the first section is reached, the decoded data row from the first section, and decoding the encoded data in the second section between the edit-out and edit-in points; and decoding and outputting, while fading in, the read and decoded data row following the second section when a time for output of the edit-in point is reached.

6. The method according to claim 5, wherein the reproduction control information includes a management table information recorded in a predetermined position on the recording medium, information before the edit-out point and information after the edit-in point.

7. A decoding player for reading an encoded data row consisting of a succession of frames, and reproduction control information including information on an edit-out point and edit-in point, respectively, having been used in data edition, from a random-accessible recording medium having recorded therein at least the encoded data row and reproduction control information, and decoding the read encoded data row based on the reproduction control information, comprising:

storing means having a storage capacity for at least several frames; and means of controlling, based on the reproduction control information, the reading from the recording medium and the decoding of the read data, the controlling means being adapted to:

determine, based on the reproduction control information, a leading position of a first section including an edit-out point and consisting of encoded data row before the edit-out point is calculated before a time for output of the edit-out point is reached, read and decode the encoded data row in the first section before the output time for the edit-out point is reached, and storing the decoded data, output, while fading out, the decoded data row from the first section when an output time for the leading position of the first section is reached, and decode the encoded data in the second section between the edit-out and edit-in points, and decode and output, while fading in, the read and decoded data row following the second section when a time for output of the edit-in point is reached.

8. The apparatus according to claim 7, wherein the reproduction control information includes a management table information recorded in a predetermined position on the recording medium, information before the edit-out point and information after the edit-in point.

9. A recording medium having recorded therein signals produced through a procedure in which: before a time for output of an edit-out point is reached, a leading position of a first section consisting of encoded data row before the edit-out point is determined based on reproduction control information recorded therein and the encoded data row in the first section is decoded and stored; when an output time for the leading position of the first section is reached, the encoded data row in a second section between the edit-out point and an edit-in point is decoded while the decoded data from the first section is being output; and when a time for output of the edit-in point is reached, the encoded data row following the second section is decoded and output.

10. A recording medium having recorded therein signals produced through a procedure in which: before a time for output of an edit-out point is reached, a leading position of a first section consisting of encoded data row before the edit-out point is calculated based on reproduction control information and the encoded data row in the first section is decoded and stored; when an output time for the leading position of the first section is reached, the decoded data from the first section is output while being faded out and the encoded data row in a second section between the edit-out point and an edit-in point is decoded; and when a time for output of the edit-in point is reached, the encoded data row following the second section is decoded and output while being faded in.

* * * * *